March 10, 1925.
M. C. ST. JOHN
CLAMP FOR BATTERY TERMINALS
Filed Sept. 21, 1921
1,529,279
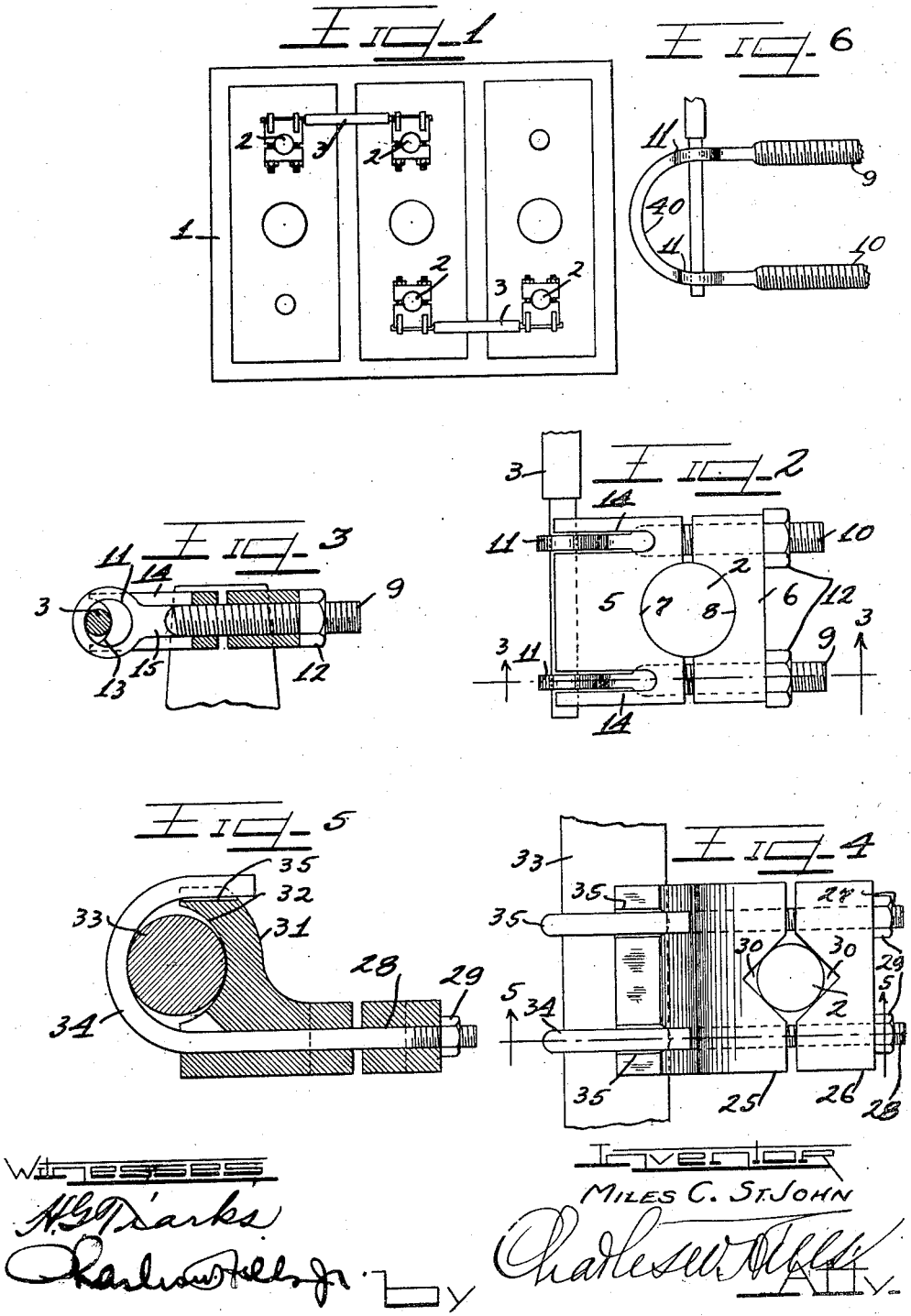

Patented Mar. 10, 1925.

1,529,279

UNITED STATES PATENT OFFICE.

MILES C. ST. JOHN, OF CHICAGO, ILLINOIS.

CLAMP FOR BATTERY TERMINALS.

Application filed September 21, 1921. Serial No. 502,193.

*To all whom it may concern:*

Be it known that I, MILES C. ST. JOHN, a citizen of the United States, and a resident of the city of Chicago, in the county of Cook and State of Illinois, have invented certain new and useful Improvements in a Clamp for Battery Terminals; and I do hereby declare that the following is a full, clear, and exact description of the same, reference being had to the accompanying drawings, and to the numerals of reference marked thereon, which form a part of this specification.

This invention relates to clamps and while described and illustrated in connection with a clamp for the connector of a secondary battery, it is capable of many other uses.

It is an object of this invention to provide a clamp whereby two round bodies of different diameters may be securely fastened together.

It is a further object of this invention to provide such a clamp which is capable of adjustment for changes in diameter of either of said cylindrical bodies.

It is a further object of this invention to provide a clamp in which the stress of the clamping device against one of two cylindrical bodies shall also act to draw the clamping jaws towards one another and the other body into close relation therewith.

It is a further object of this invention to provide a clamp which shall not only fasten two cylindrical bodies together, but shall afford good electrical contact with each of them, whereby good electrical connection between the two cylindrical bodies will be obtained.

It is a further object of this invention to provide a convenient fastening device for securing two cylindrical bodies together in a position such that their axes are at an angle to one another and not in the same plane.

Other and further important objects of this invention will be apparent from the disclosures in the drawings and the specification.

The invention (in a preferred form) is illustrated in the drawings and hereinafter more fully described.

On the drawings:

Figure 1 is a plan view of a battery with my clamp applied thereto.

Figure 2 is a top plan view of one form of clamp.

Figure 3 is a section upon the line 3—3 of Figure 2.

Figure 4 is a top plan view of a modified form of clamp.

Figure 5 is a section upon the line 5—5 of Figure 4.

Figure 6 is a detail view showing a slight modification of the bolts illustrated in Figure 2.

As shown on the drawings:

The battery 1 has its terminals 2 united by connectors 3, the connectors and terminals being fastened together by means of clamps. The clamp illustrated in Figure 2 comprises two jaws 5 and 6 which are hollowed out at 7 and 8 respectively to form a circular clamping space between the jaws. Each of the jaws 5 and 6 is traversed by a pair of aligned holes through which go rods 9 and 10 respectively. These rods are threaded all the way out to one end. The other ends of the rods are formed into circular eyes, as shown at 11 in Fig. 3.

Each of the rods is supplied with a nut 12. These nuts bear against the flat face of the member 6 opposite the hollowed out face 8. The face of the member 5 opposite the hollowed out face 7 is formed into a concave cylindrical surface, the axis of the cylindrical surface being at right angles to the axis of the cylindrical surface 7. This is shown at 13, in Figure 3. Preferably, the radius of the cylindrical surface 13 is equal to the radius of the interior of the eye 11, but this is not necessary.

In the use of the device, the rods 9 and 10 are thrust through the holes in the member 5. A wire or other cylindrical object is thrust through the eyes 11, then the other jaw 6 is placed on the rods 9 and 10, with these rods extending through the holes in the jaw 6. Finally the nuts 12 are screwed upon the bolts 9 and 10. The device is then ready to couple the wire or other object placed in the eyes 11 to whatever object is placed in the circular opening 7—8.

If the wire 3 is to be attached to the battery terminal 2, after the wire has been inserted in the eyes 11 and the clamp assembled as described, the jaws 5 and 6 are disposed on the end 2 of the battery terminal. Preferably, for this purpose, the jaws are separated widely enough for the clamp to easily pass down over the end of the terminal. The nuts 12 are then tightened. The presence of the wire 3 prevents the eyes 11 from turning when the nuts are turned, and consequently the bolts 9 and 10 will be held still and turning the nuts will draw the wire 3 toward the jaw 6. The pressure of the wire 3 against the jaw 5 will cause it to move toward the jaw 6 and the resulting action is to bring the wire 3 into close contact with the jaw 5 and the jaws 5 and 6 into close contact with the battery terminal post.

It is obvious that the presence of the wire 3 is sufficient to prevent the bolts from turning, but the portion of the bolts containing the ring may, if desired, be squared and made wider than the diameter of the shanks of the bolts, and this portion of the bolts may be contained in slots 14 in the jaw 5. Obviously, the contact of the rings 11 and of the edges of the squared parts of the bolts 15 with the sides of these slots will also prevent the bolts from turning.

A slight modification of the bolts 9 and 10, illustrated in Fig. 6, has additional means for keeping the bolts from turning. In this form, the two bolts 9 and 10 are connected by a U-shaped yoke 40 on the side of the eyes 11 opposite the threaded portions. This connection prevents either bolt from turning.

In the form illustrated in Figures 4 and 5, the clamp jaws 25 and 26 are similarly held by a pair of bolts 27 and 28 supplied with nuts 29. The faces of the jaws 25 and 26 which are toward one another are cut away to form a square recess 30. The edge of the jaw 25 opposite the recess 30 is provided with a curved flange 31 which affords a concave cylindrical surface 32 for the reception of a wire or other object 33. The ends of the bolts 27 and 28 are bent into semi-circular hook portions 34, and the hooks thus formed are adapted to surround the object 33. The ends of the hooks are continued back parallel to the main shanks of the bolts and the flange 31 is provided with grooves 35 for the reception of these ends.

In the operation of this device, the parts are assembled in the same way as explained in connection with Figure 2. Rotation of the bolts when the nuts 29 are tightened is prevented by the engagement of the end of the hooks in the grooves 35. If the object introduced into the eye 11 of the form shown in Figure 3, or into the hooks 34 in the form shown in Figure 5, is not round, it is still possible to use this form of clamp. Even if the object that is introduced is deformable, as for example, in the case of a cable of many wires, the device will force the cable into the form of the surface 32 in one case or of the surface 13 in the other case, so that good electrical connection is obtained and a firm hold secured in either case.

I am aware that numerous details of construction may be varied through a wide range without departing from the principles of this invention, and I therefore do not purpose limiting the patent granted otherwise than necessitated by the prior art.

I claim as my invention:

1. In a clamping device, a pair of jaw members, and a pair of bolts for drawing said jaw members toward one another, said bolts being shaped to engage and draw an object toward one of said jaw members, said last-named jaw member being slotted to co-operate with projecting portions of said bolts to prevent rotation of the latter.

2. In a battery terminal connector, a jaw having one face formed to fit the battery terminal, the opposite face formed to fit the conductor to be attached to said terminal, said jaw having holes therethrough to accommodate bolts and also having slots to co-operate with extensions on said bolts and prevent the bolts from turning.

In testimony whereof I have hereunto subscribed my name in the presence of two subscribing witnesses.

MILES C. ST. JOHN.

Witnesses:
CARLTON HILL,
JAMES M. O'BRIEN.